US006847016B2

(12) United States Patent
Hirst

(10) Patent No.: US 6,847,016 B2
(45) Date of Patent: Jan. 25, 2005

(54) SYSTEM AND METHOD FOR CONTROLLING POWER IN AN IMAGING DEVICE

(75) Inventor: B. Mark Hirst, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/430,748

(22) Filed: May 6, 2003

(65) Prior Publication Data
US 2004/0222213 A1 Nov. 11, 2004

(51) Int. Cl.[7] .............................................. G03G 15/00
(52) U.S. Cl. ..................... 219/486; 219/216; 399/69; 399/335
(58) Field of Search ................... 219/486, 216, 219/487, 488, 492, 508; 399/69, 328, 330, 335–336; 355/69–70, 77, 132; 346/76.1

(56) References Cited

U.S. PATENT DOCUMENTS 2,859,387 A * 11/1958 Ulffers ........................ 315/201
3,998,539 A * 12/1976 Kidd ............................ 399/178
4,214,171 A * 7/1980 Gyori ........................... 307/39
5,018,151 A   5/1991 Seaton
5,512,993 A * 4/1996 Endo et al. ................... 399/335
5,789,723 A   8/1998 Hirst
5,811,764 A   9/1998 Hirst
5,925,278 A   7/1999 Hirst
6,301,454 B1 * 10/2001 Nishida et al. ................ 399/69

FOREIGN PATENT DOCUMENTS

| JP | 62-163076  | * | 7/1987  |
| JP | 63-75775   | * | 4/1988  |
| JP | 63-184776  | * | 7/1988  |
| JP | 3-62080    | * | 3/1991  |
| JP | 7-271238   | * | 10/1995 |
| JP | 10-091036  | * | 4/1998  |
| JP | 10-186940  | * | 7/1998  |
| JP | 11-339930  | * | 12/1999 |
| JP | 2003-63674 | * | 3/2003  |

* cited by examiner

Primary Examiner—John A. Jeffery

(57) ABSTRACT

Disclosed are systems and methods for managing power in an imaging device. In one embodiment, a system and a method pertain to operating multiple heating elements in a temporally-shifted manner to create an effective drive frequency that exceeds an actual drive frequency at which the heating elements are actually driven.

21 Claims, 4 Drawing Sheets

SYSTEM AND METHOD FOR CONTROLLING POWER IN AN IMAGING DEVICE

BACKGROUND

Flicker is a problem in which the radiant intensity of lights changes significantly due to voltage fluctuations generated when large power loads are turned on or off in an electrical system. Such flicker can occur when the healing element or elements of an imaging device, such as a printer, are powered. In such a case, incandescent or fluorescent lights in the room in which the imaging device is used may noticeably flicker.

Attempting to address the flicker problem by increasing the frequency at which the heating element or heating elements are switched, thereby placing the flicker frequency beyond that which the human eye can detect, may introduce additional design challenges. For example construction of the input power filter to avoid resonance with the switching electronics may be relatively costly. Further increasing the switching frequency to reduce the construction cost of the input filter may increase the power dissipated in the components used to control the switching of the power applied to the heating elements.

SUMMARY OF THE DISCLOSURE

Disclosed are systems and methods for controlling power in an imaging device. In one embodiment, a system and a method pertain to operating multiple heating elements in a temporally-shifted manner to create an effective drive frequency that exceeds an actual drive frequency at which the heating elements are actually driven.

BRIEF DESCRIPTION OF THE DRAWINGS

The disclosed systems and methods can be better understood with reference to the following drawings. The components in the drawings are not necessarily to scale.

DETAILED DESCRIPTION

Flicker can be avoided by switching imaging device heating elements in an out of circuit at a high frequency. To avoid resonance, the frequencies of the alternating current (AC) power source, the input power filter, and the heating element drive electronics are separated by at least an order of magnitude. If the cost of the power input filter is to be kept low, the frequency of the input power filter is preferably in the range of about 4–5 kilo-Hertz (kHz), thereby requiring a drive frequency for the heating elements of about 40–50 kHz. Unfortunately, such high drive frequencies create unacceptable switch losses within the heating element control electronics. Therefore, needed is a way to obtain high drive frequencies for the heating element control electronics to decouple the power input filter from the heating elements, without inducing unacceptable frequency dependant switch losses.

As is described in the present disclosure, the input power filter of an imaging device can be decoupled from the imaging device heating elements by switching multiple heating elements on and off in a temporally-shifted manner. For example, two to four heating elements can be sequentially switched on and off to supply the heat needed by the imaging device fusing system. In such a control scheme, the power filter "sees" a relatively high drive frequency, even though the heating elements are independently driven at a frequency that is less than an order of magnitude greater the resonance frequency of the filter. Moreover, in that the actual drive frequencies for the heating elements are relatively low (although beyond detection of both the human eye and ear), high switching losses are avoided.

Disclosed herein are embodiments of systems and methods for controlling power in an imaging device. Although particular embodiments are disclosed, these embodiments are provided for purposes of example only to facilitate description of the disclosed systems and methods. Accordingly, other embodiments are possible.

Figure 1:
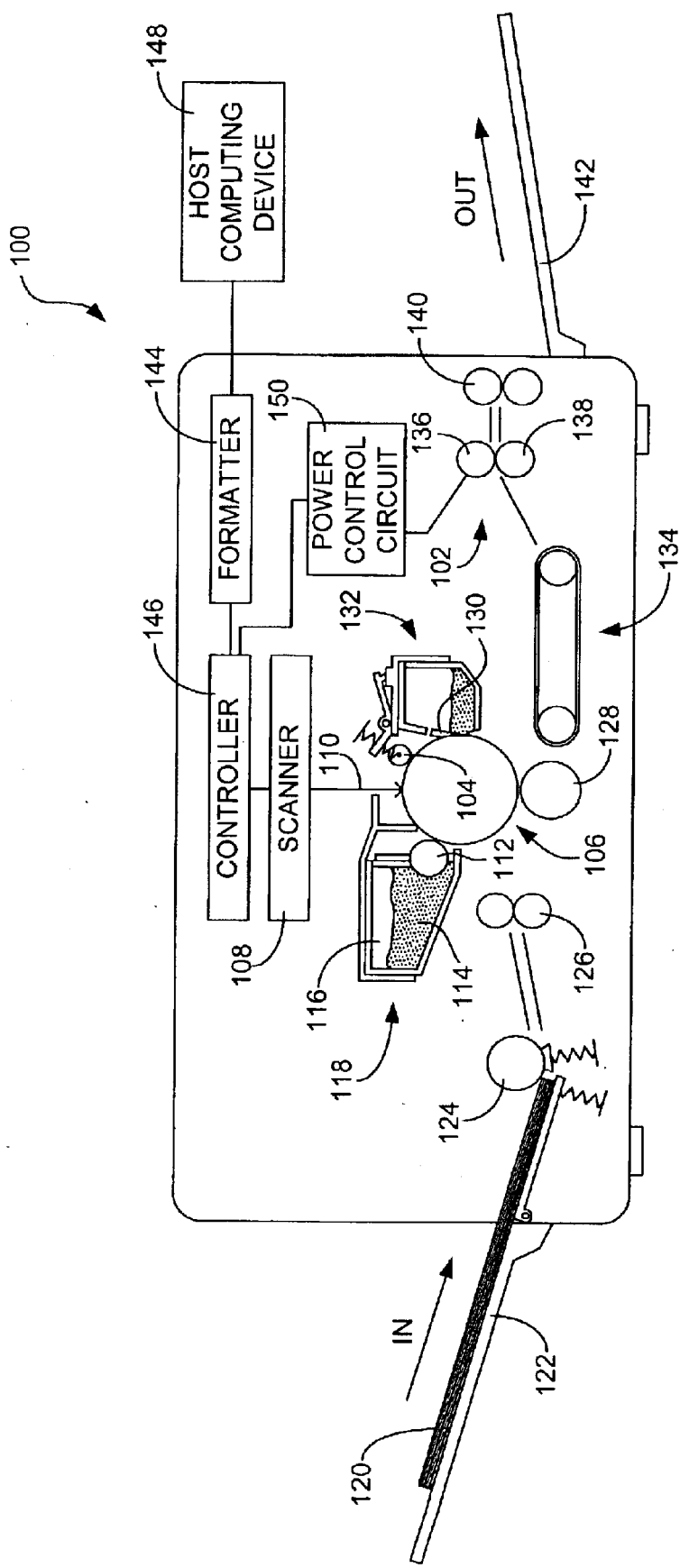
FIG. 1 is a schematic view of an embodiment of an imaging device that comprises multiple heating elements that are switched on and off.

Referring now in more detail to the drawings, in which like numerals indicate corresponding parts throughout the several views, FIG. 1 illustrates an example imaging device 100 that incorporates a fusing system 102. By way of example, the device 100 comprises a laser printer. However, the device 100 can, alternatively, comprise any other imaging device that uses a fusing system including, for instance, a photocopier or a facsimile machine.

As indicated in FIG. 1, the device 100 includes a charge roller 104 that is used to charge the surface of a photoconductor member 106 to a predetermined voltage. A laser diode (not shown) is provided within a laser scanner 108 that emits a laser beam 110 that is pulsed on and off as it is swept across the surface of the photoconductor member 106 to selectively discharge the surface of the member. In the orientation shown in FIG. 1, the photoconductor member (e.g., drum) 106 rotates in the counterclockwise direction. A developing roller 112 is used to develop a latent electrostatic image residing on the surface of photoconductor member 106 after the surface voltage of the member has been selectively discharged.

Toner 114 is stored in a toner reservoir 116 of a print cartridge 118. The developing roller 112 includes an internal magnet (not shown) that magnetically attracts the toner 114 from the print cartridge 118 to the surface of the developing roller. As the developing roller 112 rotates (clockwise in FIG. 1), the toner 114 is attracted to the surface of the developing roller 112 and is then transferred across the gap between the surface of the photoconductor member 106 and the surface of the developing roller to develop the latent electrostatic image.

Recording media 120, for instance sheets of paper, are loaded from an input tray 122 by a pickup roller 124 into a conveyance path of the device 100. Each recording medium 120 is individually drawn through the device 100 along the conveyance path by drive rollers 126 such that the leading edge of each recording medium is synchronized with the rotation of the region on the surface of the photoconductor member 106 that comprises the latent electrostatic image. As the photoconductor member 106 rotates, the toner adhered to the discharged areas of the member contacts the recording medium 120, which has been charged by a transfer roller 128, such that the medium attracts the toner particles away from the surface of the member and onto the surface of the medium. Typically, the transfer of toner particles from the surface of the photoconductor member 106 to the surface of the recording medium 120 is not completely efficient. Therefore, some toner particles remain on the surface of the photoconductor member. As the photoconductor member 106 continues to rotate, the toner particles that remain adhered to the member's surface are removed by a cleaning blade 130 and deposited in a toner waste hopper 132.

As the recording medium 120 moves along the conveyance path past the photoconductor member 106, a conveyer 134 delivers the recording medium to the fusing system 102. The recording media 120 passes between a fuser roller 136 and a pressure roller 138 of the fusing system 102. One or both of these rollers 136, 138 comprise one or more heating elements (not shown) that are used to provide heat to the fusing system 102. Moreover, the fusing system 102 may include additional heating elements that are external to the rollers 136, 138 (not shown).

As the pressure roller 138 rotates, the fuser roller 136 is rotated and the recording medium 120 is pulled between the rollers. The heat applied to the recording medium 120 by the heating elements fuses the toner to the surface of the recording medium. Finally, output rollers 140 draw the recording medium 120 out of the fusing system 102 and delivers it to an output tray 142.

As identified in FIG. 1, the device 100 can further include a formatter 144 and a controller 146. The formatter 144 receives print data, such as a display list, vector graphics, or raster print data, from a print driver operating in conjunction with an application program of a separate host computing device 148. The formatter 144 converts the print data into a stream of rasterized video print data, which may be binary or gray scale in nature, and sends it to the controller 146. In addition, the formatter 144 and the controller 146 exchange data necessary for controlling the imaging process. In particular, the controller 146 supplies the stream of video print data to the laser scanner 108. The video print data stream sent to the laser diode within the laser scanner 108 pulses the laser diode to create the latent electrostatic image on the photoconductor drum 106.

In addition to providing the video print data stream to the laser scanner 108, the controller 146 controls a high voltage power supply (not shown) that supplies voltages and currents to the components used in the device 100 including the charge roller 104, the developing roller 112, and the transfer roller 128. The controller 146 further controls a drive motor (not shown) that drives the printer gear train (not shown), various clutches and feed rollers (not shown) necessary to move recording media 120 through the conveyance path of the device 100, and a power control circuit 150 that, in turn, controls the application of power to the fusing system 102. Examples for the configuration of the power control circuit 150 are provided in FIGS. 2 and 5.

Figure 2:
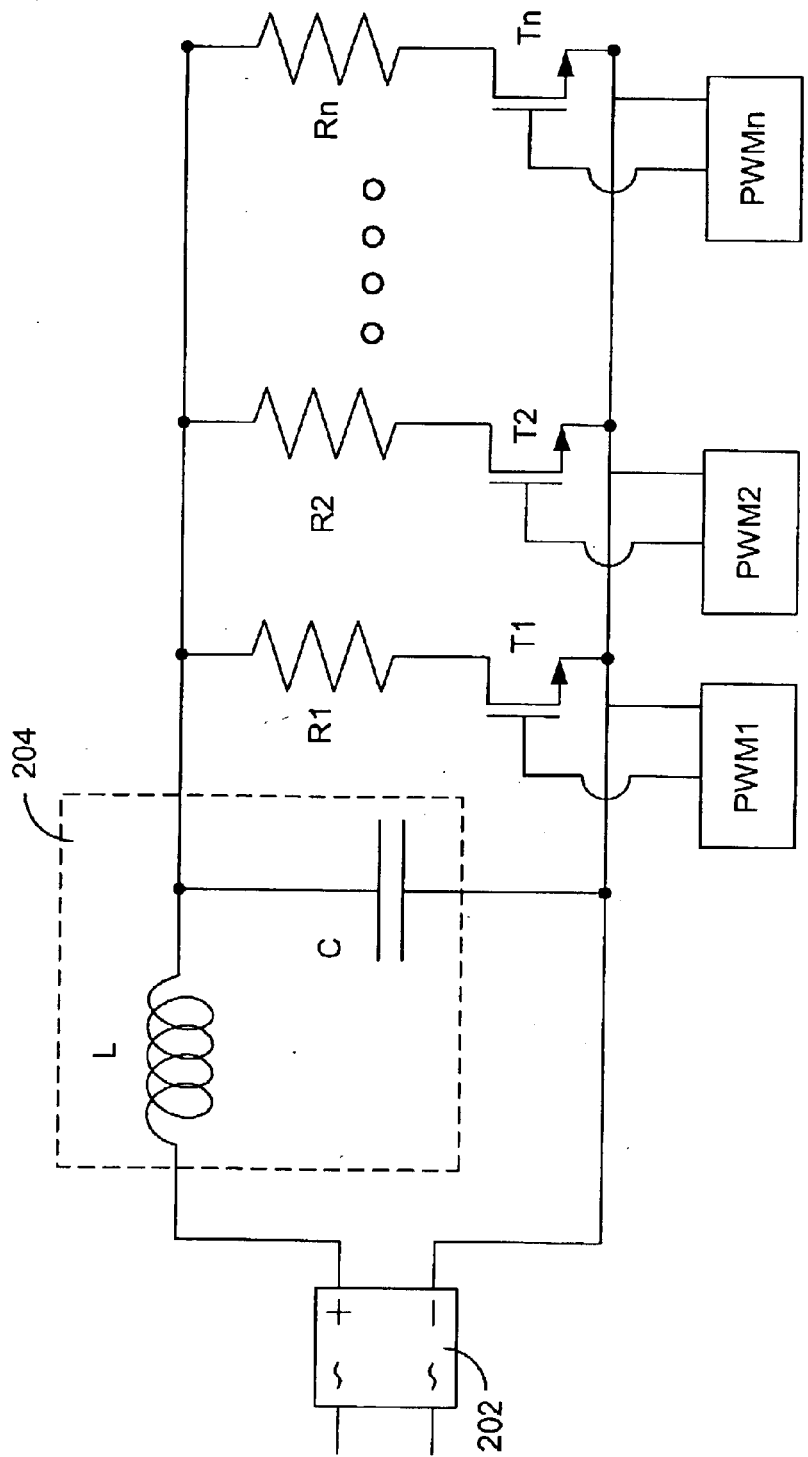
FIG. 2 is a schematic of a first embodiment of a circuit that may be used in the imaging device of FIG. 1 to control powering of the device heating elements.

FIG. 2 illustrates a first embodiment of a power control circuit 200 that can be used in the imaging device 100 of FIG. 1 to power heating elements of the device. As indicated in FIG. 2, the circuit 200 comprises multiple heating elements, represented by resistors R1–Rn. By way of example, each of the heating elements may comprise a thick-film resistive heating element, a nichrome metal alloy resistive heating element, a tungsten filament quartz halogen lamp, or a magnetic induction type heating element. Power is provided to the circuit 200, and therefore to the heating elements, by a power source (not shown) via a rectifier 202, which converts the alternating current (AC) signal to a full wave rectified direct current (DC) signal. Between the rectifier 202 and the heating elements R1–Rn is a power input filter 204 that smooths the pulse width-modulated current drawn by the heating elements to a continuous AC current so that continuous, relatively ripple-free current is drawn by the circuit 200. In the embodiment shown in FIG. 2, this input filter 204 comprises a series resonant LC filter that includes an inductor L and a capacitor C.

The heating elements R1–Rn are switched in an out of circuit using pulse width modulators PWM1–PWMn that are controlled by the imaging device controller 146 or by master fuser power control circuit (not shown). In one embodiment, the heating elements (assuming three such elements) can be switched in and out of circuit using a modulo-3 counter connected to a 1:3 selector that divides a master clock into three sub-clocks with a predetermined temporal spacing. The pulse width modulators control switches, such as transistors T1–Tn, that enable or disable the flow of current through the heating elements R1–Rn to thereby control which heating elements are powered at any given time. Although a single pulse width modulator could be used to power each heating element, separate modulators are used so that, as is described in relation to FIG. 3, the heating elements can be operated in a temporally-shifted manner.

Figure 3:
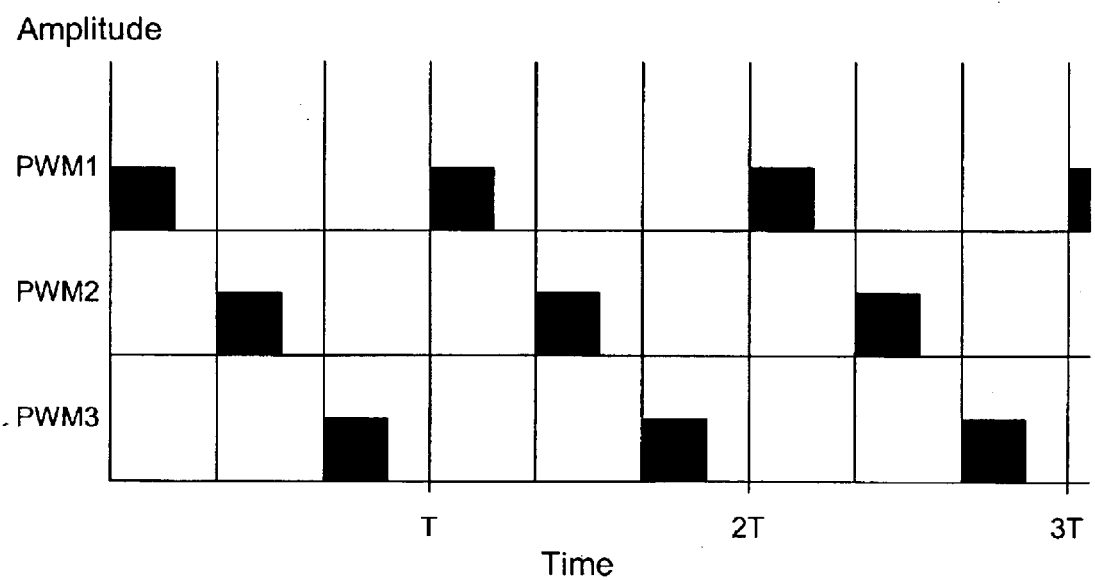
FIG. 3 is a plot illustrating an embodiment of temporally-shifted powering of multiple heating elements using the circuit shown in FIG. 2.

FIG. 3 illustrates an example of operation of the circuit 200 shown in FIG. 2. More particularly, FIG. 3 depicts the temporally-shifted operation (i.e., powering) of the heat elements as a function of time. As is illustrated in FIG. 3, each of the heating elements is powered by its associated pulse width modulator PWM in sequence. In the example of FIG. 3 three heating elements are assumed and, therefore, three pulse width modulators PWM1–PWM3, are used. In such a case, the three different heating elements may be used in a zone heating scheme in which particular parts of the fusing system rollers are heated depending, at least in part, upon the size (i.e. width) of the print media used.

In FIG. 3, the first heating element is powered by PWM1 and then switched off, followed by powering of the second heating element by PWM2 and then switching that heating element off, and so forth. Over a period of time T, each of the three heating elements has been powered on and off. If, this time T comprises about 50 microseconds ($\mu$s), each heating element is driven on and off with an actual drive frequency of about 20 kHz. Assuming equal time spacing of the on/off cycles of the heating elements in time T, each sequential heating element is powered on after a period of approximately 16.67 $\mu$s from the powering of the previous heating element. By way of example, each heating element may remain on for a period of approximately 12 $\mu$s. In this example, each pulse width modulator operates at a duty ratio, d, of 12/50 or 24%. It is noted that the duty ratio of each pulse width modulator can very independently from each other over a range from 0 to 1.0. Therefore, multiple heating elements may be powered at the same time, even though they are switched on at separate times.

Figure 4:
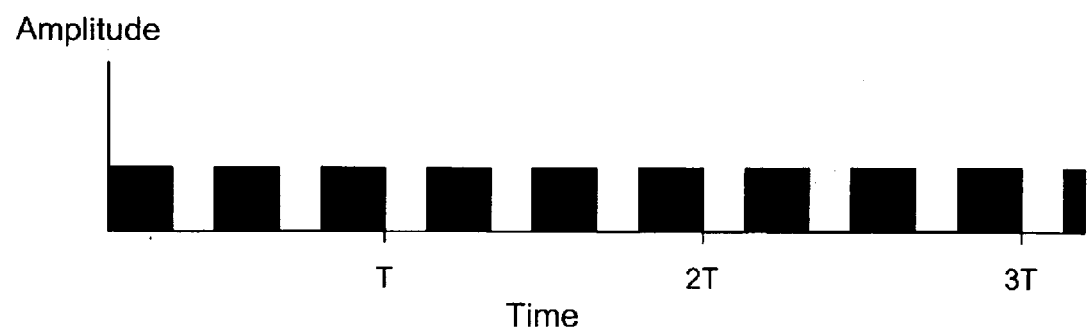
FIG. 4 is a plot of an effective drive frequency obtained from the temporally-shifted powering shown in FIG. 3.

FIG. 4 illustrates the effective drive frequency applied to the power input filter when the heating elements are powered in the manner illustrated in FIG. 3. As is apparent from this figure, a much higher effective drive frequency is applied to the input filter than that actually used to drive each individual heating element. In the example of FIG. 3, in which three such heating elements are powered, this effective drive frequency is three times the drive frequency used to drive each independent heating element. Therefore, assuming a drive frequency of about 20 kHz for each heating element, the input filter "sees" an effective drive frequency of about 60 kHz (i.e. 1/16.67 μs).

With such an effective drive frequency, the resonance frequency of the input power filter (e.g., filter 204 of FIG. 2) can be made much larger and, therefore, the filter can be made smaller and less expensively. To cite an example, if one or more heating elements were driven simultaneously at a frequency of about 20 kHz, the inductance of the inductor of an LC filter may be reduced from 150 micro-Henries (μH) to 75 μH if temporally-shifted operation is used instead. In similar manner, the capacitance of the capacitor of the LC filter may be reduced from 5 micro-Farads (μF) to 2 μF. This results in significant cost savings. Alternatively or in addition, the AC ripple current created by the circuit 200 can be significantly reduced. In an AC system with an LC power filter as given in the previous example, the total AC current can be described as being composed of an AC component at the power source frequency (i.e., 60 Hz) and a ripple component at the drive frequency of the pulse width modulated load. The total current for a single phase system or poly-phase system with all loads and duty ratios equal, is governed by the equation:

$$i_L(t) = \frac{V \cdot d}{R} \cdot \sin(2 \cdot \pi \cdot f_o \cdot t) + \quad \text{[Eq. 1]}$$
$$\frac{\pi^2}{4} \cdot (1-d) \cdot \left(\frac{f_c}{f_s}\right)^2 \cdot \frac{V \cdot d}{R} \cdot \sin(2 \cdot \pi \cdot f_o \cdot t) \cdot \sin(2 \cdot \pi \cdot f_s \cdot t)$$

where $f_c$ is the LC filter resonant frequency, $f_s$ is the switch frequency, $f_o$ is the source frequency, d is the duty cycle of the pulse width modulator, V is the peak source voltage, and R is the load resistance. According to this formula, the ripple current decreases by the square of the pulse width modulator switch frequency. Therefore, if the values of the filter components are held constant and the effective drive frequency is tripled, the ripple current is reduced by a factor of 9.

In addition to the above-noted advantages, switch losses in the circuit 200 are relatively low in that the drive frequencies of the heating elements are relatively low. It is noted that similar results may be achieved with systems comprising other than three heating elements. For instance, when two heating elements are controlled in the manner described above at a frequency of about 20 kHz, an effective drive frequency of about 40 kHz is observed by the filter, thereby permitting the use of a filter having a resonance frequency of 4 kHz. To cite another example, when four heating elements are driven at a frequency of about 20 kHz, an effective drive frequency of about 80 kHz is achieved.

Figure 5:
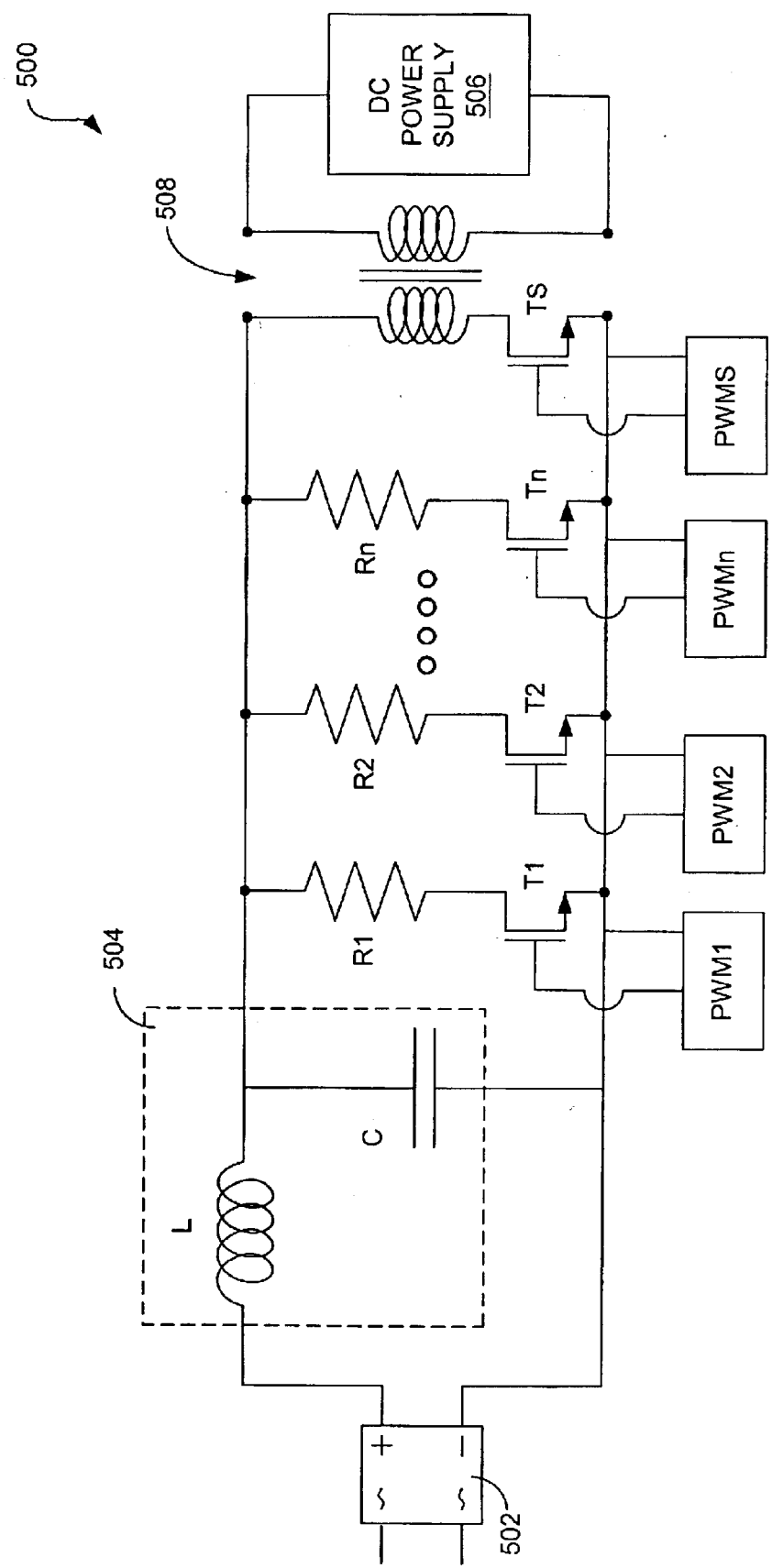
FIG. 5 is a schematic of a second embodiment of a circuit that may be used in the imaging device of FIG. 1 to control powering of the device heating elements.

FIG. 5 illustrates a second embodiment of a power control circuit 500 that can be used in the imaging device 100 of FIG. 1. As indicated in FIG. 5, the circuit 500, like circuit 200 in FIG. 2, comprises multiple heating elements, represented by resistors R1–Rn, a rectifier 502, and a power input filter 504. In the embodiment shown in FIG. 5, however, the circuit includes a DC power supply 506 that is connected to the remainder of the circuit with a transformer 508 that, under control of a supply pulse width modulator PWMS that operates a transistor TS, transfers current to the DC power supply. The DC power supply 506 is used to power the remaining electrical components of the imaging device 100. Therefore, in the embodiment shown in FIG. 5, all electrical components of the imaging device 100 are powered using one power control circuit.

The circuit 500 is controlled in similar manner to that used to control the circuit 200 shown in FIG. 2. Accordingly, the heating elements R1–Rn and the DC power supply 506 are switched in an out of circuit using pulse width modulators PWM1–PWMn and PWMS in a temporally-shifted manner. With such an arrangement, the effective frequency applied to the input power filter 504 is further increased by the addition of the DC power supply 506. Therefore, assuming a drive frequency of about 20 kHz for three heating elements and the DC power supply 506, the effective frequency "seen" by the filter 504 is about 80 kHz, thereby enabling even smaller, and therefore less expensive, components to be used in the construction of the power filter 504. Moreover, because all electrical components of the imaging device are powered using a single power circuit, only one power filter is needed, thereby further increasing savings.

What is claimed is:

1. A method for controlling power in an image device, comprising:
   switching multiple heating elements on and off; and
   temporally-shifting the turning on and off of the multiple heating elements to create an effective drive frequency that exceeds an actual drive frequency at which the heating elements are actually turned on and off;
   providing power to a direct current (DC) power supply in a temporally-shifted manner along with the heating elements.

2. The method of claim 1, wherein switching multiple heating elements on and off comprises switching the heating elements on and off using separate pulse width modulators.

3. The method of claim 1, wherein switching multiple heating elements on and off comprises switching the heating elements on and off at an actual frequency of about 20 kHz.

4. The method of claim 3, wherein switching multiple heating elements on and off comprises switching two heating elements on and off such that an effective frequency of about 40 kHz is achieved.

5. The method of claim 3, wherein switching multiple heating elements on and off comprises switching three heating elements on and off such that an effective frequency of about 60 kHz is achieved.

6. The method of claim 3, wherein switching multiple heating elements on and off comprises switching four heating elements on and off such that an effective frequency of about 80 kHz is achieved.

7. The method of claim 1, wherein temporally-shifting the turning on and off of the multiple heating elements comprises temporally-shifting the turning on and off such that no two heating elements are powered on at the same time.

8. The method of claim 7, wherein each of the heating elements is turned on and off within a period of about 50 μs.

9. The method of claim 1, wherein providing power to a direct current (DC) power supply in a temporally-shifted manner comprises temporally-shifting the powering of the DC power supply and the turning on and off of the heating elements such that no two heating elements are powered on at the same time and no heating elements are powered at the same time the DC power supply is powered on.

10. The method of claim 1, wherein providing power to a direct current (DC) power supply in a temporally-shifted manner along with the heating elements comprises powering each of the heating elements and the DC power supply within a period of about 50 μs.

11. A power circuit, comprising:
   a power input filter;
   multiple heating elements that are provided with power via the power input filter; and multiple pulse width modulators, one pulse width modulator being associated with each heating element;

wherein each pulse width modulator is configured to switch its associated heating element on and off in a temporally-shifted manner with respect to the other heating elements such that an effective drive frequency for the heating elements exceeds an actual drive frequency at which each heating element is actually driven;

providing power to a direct current (DC) power supply in a temporally-shifted manner along with the heating elements;

a direct current (DC) power supply and a pulse width modulator associated with the DC power supply that is configured to power the DC power supply in a temporally-shifted manner with respect to the heating elements.

12. The circuit of claim 11, wherein the power input filter comprises a resonant LC filter that includes an inductor and a capacitor.

13. The circuit of claim 11, wherein the circuit includes two heating elements.

14. The circuit of claim 11, wherein the circuit includes three heating elements.

15. The circuit of claim 11, wherein the circuit includes four heating elements.

16. The circuit of claim 11, further comprising a controller that controls operation of the pulse width modulators.

17. The circuit of claim 11, further comprising a transformer that delivers current to the DC power supply.

18. The power circuit of claim 11, wherein each of the heating elements is driven at a frequency that is less than an order of magnitude greater than a resonant frequency of the power input filter.

19. A system for controlling power in an image device, comprising:

means for switching heating elements in and out of circuit; and means for temporally-shifting the switching of the heating elements so as to create an effective drive frequency that exceeds an actual drive frequency at which the heating elements are actually switched in an out of circuit;

further comprising means for powering a direct current (DC) power supply in a temporally-shifted manner along with the heating elements.

20. An imaging device, comprising:

a fusing system that includes multiple heating elements;

a power input filter that is used to filter power that is provided to the heating elements;

multiple pulse width modulators that control the supply of power from the power input filter to the heating elements, one pulse width modulator being associated with each heating element;

a controller that is configured to control the pulse width modulators such that they switch their associated heating elements on and off in a temporally-shifted manner with respect to the other heating elements so that an effective drive frequency for the heating elements exceeds an actual drive frequency at which each heating element is actually driven; and a direct current (DC) power supply that supplies power to other imaging device components and a pulse width modulator that is configured to power the DC power supply in a temporally-shifted manner with respect to the heating elements.

21. The device of claim 20, further comprising a transformer that delivers current to the DC power supply.

* * * * *